United States Patent [19]

Schumacher et al.

[11] 4,314,134
[45] Feb. 2, 1982

[54] BEAM POSITION CONTROL FOR ELECTRON BEAM WELDER

[75] Inventors: Berthold W. Schumacher; John C. Cooper, both of Dearborn, Mich.

[73] Assignee: Ford Motor Company, Dearborn, Mich.

[21] Appl. No.: 96,864

[22] Filed: Nov. 23, 1979

[51] Int. Cl.³ .............................................. B23K 15/00
[52] U.S. Cl. ...................... 219/121 EW; 219/121 ED; 250/397
[58] Field of Search .................. 219/121 EB, 121 EC, 219/121 ED, 121 EM, 121 EW, 124.34; 250/354, 355, 397

[56] References Cited

U.S. PATENT DOCUMENTS

| | | | |
|---|---|---|---|
| 3,149,257 | 9/1964 | Wintermute | 219/121 EB X |
| 3,370,151 | 2/1968 | Normando | 219/124.34 X |
| 3,534,387 | 10/1970 | Sanderson et al. | 219/121 EC |
| 3,766,355 | 10/1973 | Kottkamp | 219/124.34 X |
| 4,092,516 | 5/1978 | Martin | 219/121 EC X |
| 4,160,165 | 7/1979 | McCombs | 250/354 |

FOREIGN PATENT DOCUMENTS 2634341  2/1978  Fed. Rep. of Germany .... 219/121 EM

OTHER PUBLICATIONS

*Welding Journal*; Welding Research Supplement, Feb. 1976, pp. 52-s to 55-s; "Electron Beam Welding Spike Suppression Using Feedback Control" by Tews et al.

*Primary Examiner*—Gene Z. Rubinson
*Assistant Examiner*—Keith E. George
*Attorney, Agent, or Firm*—Frank G. McKenzie; Donald J. Harrington

[57] ABSTRACT

An electron beam position control for maintaining the position of a beam of charged particles that strikes a workpiece at an impact spot includes an adjustable aperture through which X-rays emanating from the impact spot pass, a rotating cylinder having a plurality of slots formed on its outer surface, a scintillator crystal and photo multiplier located within the rotating cylinder, an electronic circuit for producing an error signal that energizes one or the other of two magnetic coils, which are effective in redirecting the electron beam so that its focal point strikes the workpiece at the target or reference position.

18 Claims, 10 Drawing Figures

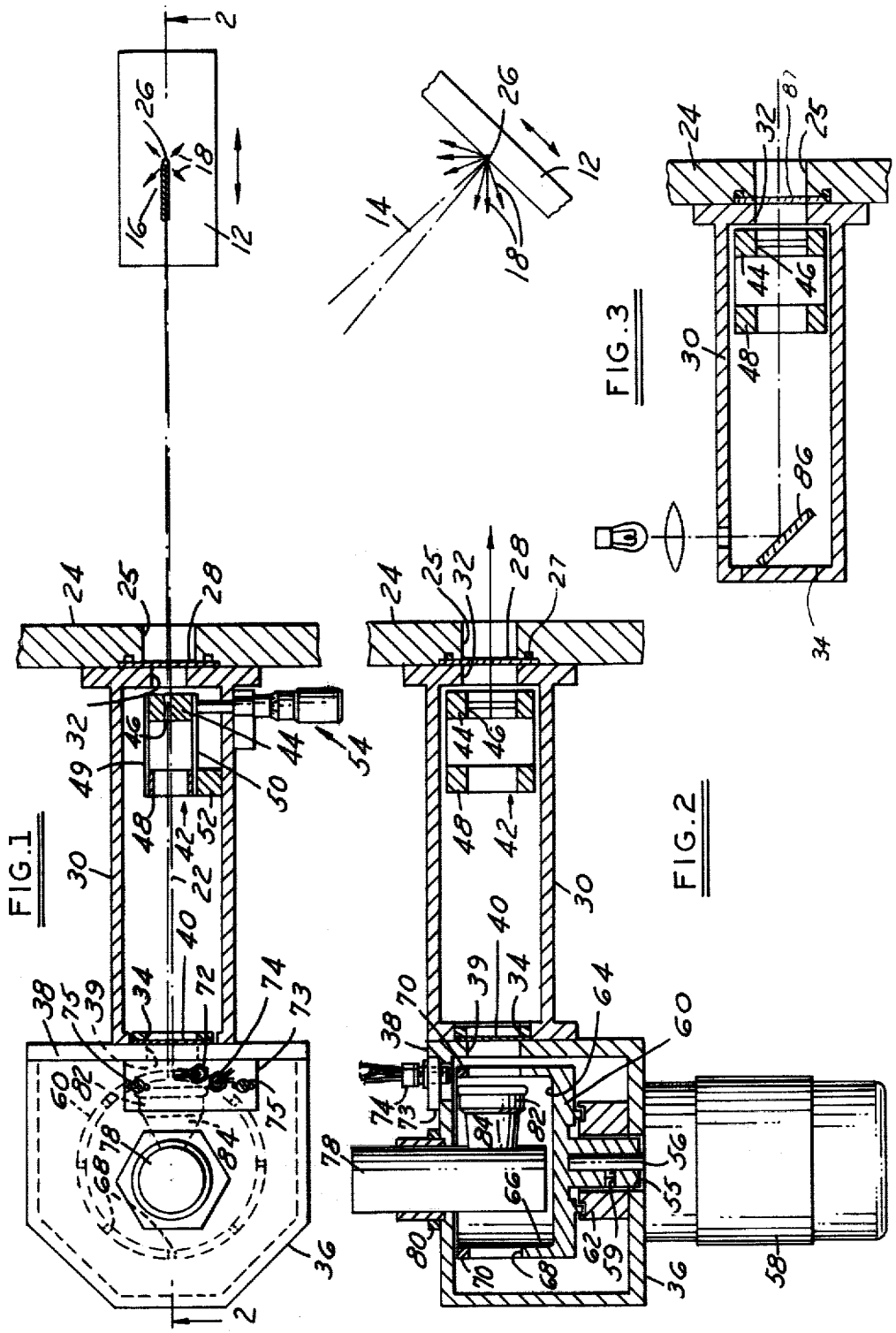

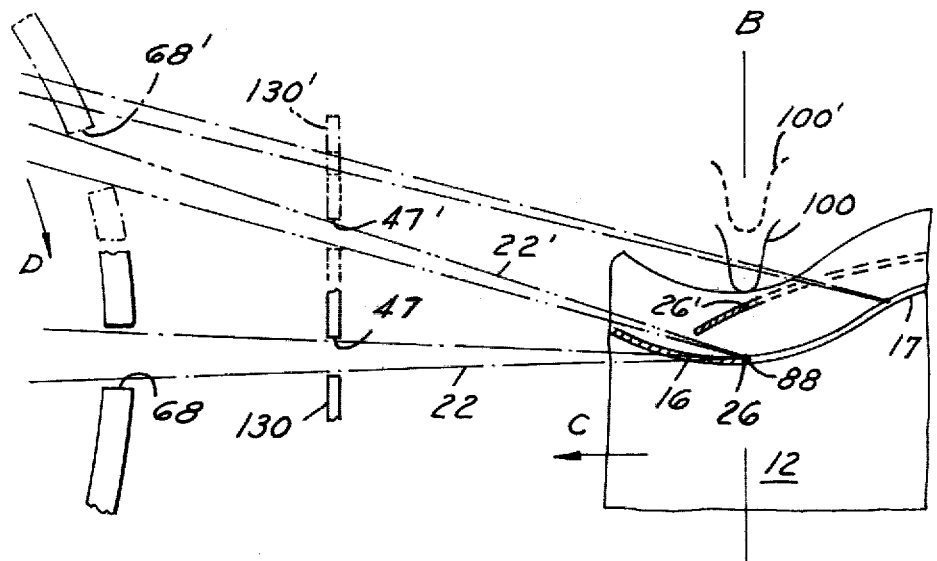
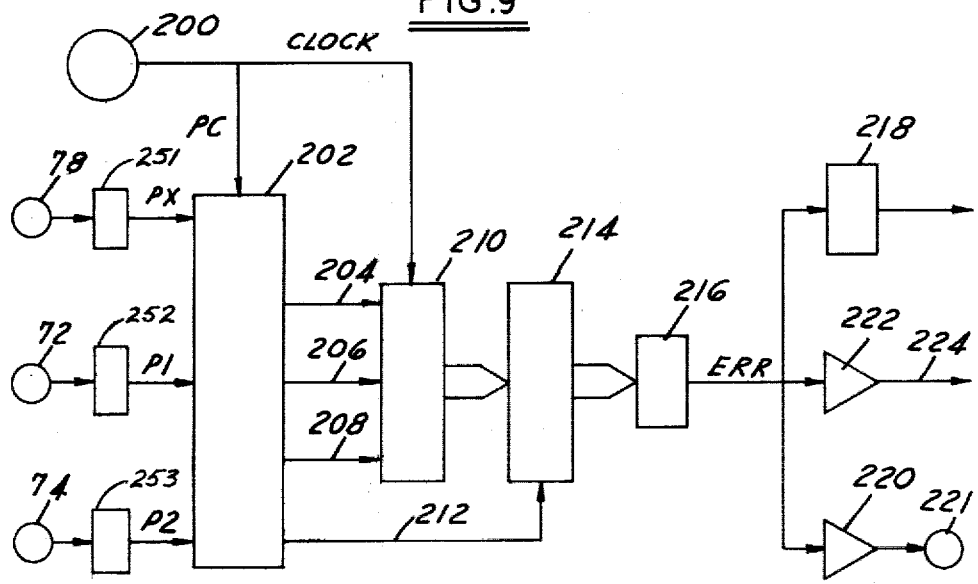

BEAM POSITION CONTROL FOR ELECTRON BEAM WELDER

BACKGROUND OF THE INVENTION

1. Field of the Invention

This invention relates to a control for maintaining the position of an impact spot of an electron beam on a workpiece, and, more particularly, to such a control that utilizes X-rays emanating from the impact spot to adjust the direction of the electron beam so that the actual impact spot is coincident with its reference position.

2. Description of the Prior Art

Electron beam welding is generally performed in the interior of a vacuum chamber so that during the welding process the position of the focused electron beam on the workpiece being welded must be had by observation through windows in the vacuum chamber walls. Welding that employs the use of an electron beam requires that the beam impact the workpiece at a point that is on the weld seam between the parts being welded.

Electron beam welding has heretofore been limited by the ability of a control system to maintain an accurate control of the position of the impact spot in relation to a predetermined path that the weld is intended to take. By means of electric or magnetic field the beam can be deflected to follow any pre-programmed path, the deflection fields being pre-programmed by, for example, a computer, just as in any cathode ray oscilloscope or in a television tube. However, the programmed path may not coincide with the intended weld path for several reasons: there may be an error in the command signal; the beam's response may change; spurious electrical and magnetic fields may cause unintended additional deflections; and the joint line between the work pieces may differ from its presumed path in order to overcome the difficulties in controlling the position of the impact spot and to maintain its position precisely on the joint line between the parts to be welded, various control techniques have been attempted and are known from the prior art. Typical of these is an optical control system wherein optical means are placed in the path of light emanating from the welding spot in order to observe the position of the welding spot in its relationship to the parting line. The observed light radiation is detected by an optical electrical conversion device to obtain electrical signals representative of the position of the welding spot. These electrical signals are then used to control and to adjust the position of the impact spot on the workpiece. Control systems employing optical means of this sort are set out in U.S. Pat. Nos. 3,766,355 and 3,471,703. Optical control systems are encumbered by the need for the detector to have an unobscured view of the impact spot. Unfortunately, this spot is obscured in actual practice by the surrounding incandescent glow at the impact spot and by the metal vapor produced during the welding process in the immediate vicinity of the impact spot.

Magnetic and electrostatic beam sensors have been employed to position the impact spot on the workpiece, but systems employing this approach require the use of pulsed beams. They are, therefore, not applicable to control DC welding beams. Disclosure of control systems of the magnetic sensor type are described in U.S. Pat. Nos. 3,496,463 and 3,152,238.

A third means known in the prior art for controlling the position of the impact spot is the use of electron beam scanning control systems. Scanning systems have been described in the following U.S. Pat. Nos. 3,513,285 and 3,573,358, RE 27,005 and 3,609,288. Scanning systems require that the beam power be reduced below the levels required for welding. As a result of this the impact spot produced with the lower power beam may not be located at the same point as the impact spot produced by the higher power beam. Prescanning before the actual welding process requires the storage of data, the necessary computer memory and later recall of the data during the actual welding process so that the reference position can be related to the actual position of the weld spot. In the time interval between scanning the workpiece and the welding operation, all inactive parameters must remain extremely stable. The electronic stabilization of high voltage, at high power and variable power, as is typically used in electron beam welding, requires complex and expensive electronic circuits. With our system inherent beam stability is much less critical.

SUMMARY OF THE INVENTION

According to a specific embodiment illustrated in the drawing of this application and discussed in detail below, a position control made according to this invention for holding the impact spot of a focused electron beam in a predetermined position on the workpiece has an aperture whose position is adjusted manually by the welding operator. The position of the adjustable aperture defines a linear path along which X-rays emanating from the impact spot may travel. The path of travel for the X-rays so defined is directed to a moving aperture that admits the X-rays to pass therethrough and onto a scintillator crystal that produces a light signal when the X-rays strike the crystal. The light signal is transmitted to a photomultiplier that produces an electrical pulse in response to the light signal. A second electrical pulse is produced after the first pulse when the movable aperture passes a first magnetic pickup. A third electrical pulse occurs when the moving aperture passes a second magnetic pickup. The speed of the moving aperture is held substantially constant and the distance between the magnetic pickups is predetermined; therefore, the interval between the occurrence of the second and third electrical pulse is a measure of the speed with which the aperture is moving. The interval between the first and second electrical pulses is, however, a variable that depends upon the angle at which the X-rays enter and pass through the adjustable aperture and the moving aperture. When the actual impact spot of the focused electron beam is coincident with the reference spot, which is a point on the weld seam, the first and second intervals are identical in duration. The location of this reference spot is independent of the speed of motion of the aperture, since it is determined by comparison of these two time intervals. However, when the impact spot is displaced from its reference position, the first time interval is greater or less than this second interval. The difference between intervals is a measure of displacement of the impact spot from its reference position and is indicative also of the direction of that displacement from the reference position. An error signal is produced from the difference in duration of the first and second intervals and the error signal is made to produce a current that is carried to magnetic coils, through the field of which the electron beam passes. When the coils are actuated, a magnetic field is created, the polarity of which depends upon the direction of current flow through the magnetic deflection coils. The magnetic field so produced is effective in altering the direction of the electron beam thereby relocating the impact spot to the reference position.

A second embodiment of this invention provides an impact spot positioning control for an electron beam welding machine that is producing a weld along a seam whose position on the workpiece is continually varying. A control of this sort permits welds to be made that are nonlinear and noncircular, but may traverse a path having any direction. A follower arm is held in contact with the outer contour of the workpiece where a template, attached to the workpiece provides a surface for the follower to contact. In this instance, the adjustable aperture follows the contour changes of the workpiece, which contour is located at the predetermined distance from the weld seam to be made. The control of this embodiment permits a continuously varying impact spot position to be established by the adjustable aperture whose position is related to the course of travel of the weld seam. The adjustable aperture defines a linear path of travel for the X-rays emanating from the impact spot and permits the passage of those X-rays therethrough and onwardly to a moving aperture. When the X-rays enter this moving aperture, an electrical pulse is produced. Second and third electrical pulses are similarly produced when the moving aperture passes under two magnetic pickups. The error signal is produced depending upon the duration of first and second intervals that extend between the occurrences of the first and second, and between the second and third electrical pulses. The error signal is effective and adapted to regulate actuation of magnetic coils, which redirect the electron beam and effect a correction of the impact spot to its reference position.

A combination of control units arranged so that the X-rays emanating from the weld spot proceed through the apertures along lines that are generally perpendicular to one another can produce control of the weld seam in both the longitudinal and transverse directions. Transverse control is instrumental in regulating the rate at which the weld seam is produced. This regulation is an advantage in producing welds of a particularly high quality and uniformity and avoids the possibility of the weld spot being held at a particular position for a longer period of time than it is held on the weld seam at another point along the weld path.

The surface on which the follower moves need not be a contour of the part being welded, but could be the contoured surface of any member whose distance from the weld seam is a fixed distance.

Irregular, nonlinear weld seams can be produced by this control device and since the workpiece is moved linearly under the electron beam, precision jigging and fixturing of the workpiece within the vacuum chamber is no longer required.

BRIEF DESCRIPTION OF THE FIGURES OF THE DRAWINGS

FIG. 1 is a plan view of an impact spot position control having an aperture whose position is manually adjusted for establishing a reference impact spot onto which the actual impact spot is held by adjustments made to the electron beam direction.

FIG. 2 is a side elevation, partially in cross-section, taken at plane 2—2 of FIG. 1.

FIG. 3 is a side elevation view, partially in cross-section, of a light source used in conjunction with the electron beam impact spot at position control for indicating the position of the reference impact spot when the electron beam is not operating.

FIG. 8 is a plan view showing an incremental displacement of the workpiece follower due to a variation in contour of the workpiece and the resultant angular displacement of the X-ray cone that passes through the rotating drum slots.

FIG. 9 is a block diagram of the electronic control that receives the three electrical pulses produced by the photodiode and magnetic pickups to produce the electron beam deflection control current.

DESCRIPTION OF THE PREFERRED EMBODIMENT

Figure 4:
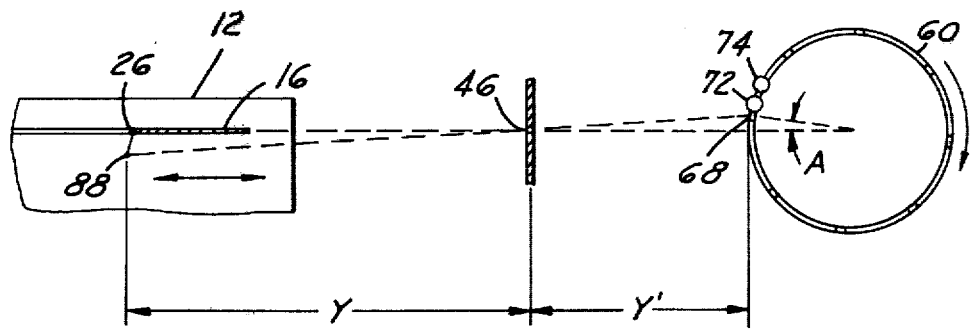
FIG. 4 is a plan view schematically showing the angular change in position of the X-ray field when the actual impact spot is displaced from the reference impact spot.

Referring first to FIGS. 1 and 2, a workpiece 12 moving with respect to a focused electron beam cone 14 is being welded along the line that includes the weld seam 16 and the joint line of the workpiece being welded. As the workpiece passes under the impact spot 26 of the electron beam, the weld progresses along the weld line and through the thickness of the workpiece. X-rays 18 emanate from the impact spot and travel in straight lines outwardly therefrom. These X-rays are referred to as primary X-rays and are distinguished from secondary or reflected X-rays, which have considerably less energy than the primary type by reason of their having been reflected from other surfaces after being originally radiated from the impact spot. Secondary or fluorescent X-rays are spurious and unrepresentative of the exact position of the impact spot that results when a high voltage electron beam strikes a metal workpiece. Reflected, secondary X-rays are easily absorbed by a metallic filter of a suitable thickness because of the low level of energy they possess. Primary X-rays, however, vary widely in intensity (but not in quantum energy nor KeV) over the range 1 to 100,000 units when measured by any detector, for instance, the current output of the photomultiplier tube or an ionization chamber or the count-rate of a Geiger counter. Therefore, a detector for establishing the position of the impact spot must be relatively insensitive to the intensity level of the primary X-rays.

The workpiece is moved longitudinally along a linear path toward or away from the electron beam positioner control unit, or is rotated to produce a circular weld line. The impact spot 26, in either case, must be held on the line 2—2 of FIG. 1. Preferably, the electron beam 14 is directed perpendicular to the outer surface of the workpiece 12 with which is makes impact. The workpiece is arranged so that its outer surface makes a large angle in the range 30–90 degrees with the longitudinal axis 2—2 that passes through the control unit. This angular relationship is important in order to assure that the X-rays emanating from the impact spot 26 and passing into the control unit are not blocked or impeded by the molten metal. It has been found that as the weldment is made on the workpiece molten metal rises up from the surface of the workpiece in the space between the impact spot and the control unit. The molten metal that forms the weld can, therefore, obscure the position of the impact spot from the view of the control unit. Droplets of the molten metal in the vicinity of the impact spot are another means by which primary X-rays are concealed from the control unit. When the angle between the line of sight through the control unit and the surface of the workpiece 12 is approximately 45 degrees, the performance of the beam positioning controller has been found to produce accurate results, whereas when that angle is 10 degrees or smaller, the blockage previously described has been found to produce inferior results.

The electron beam weld is preferably, although not necessarily, performed in a vacuum chamber whose wall is represented at 24. The vacuum within the chamber is typically in the range between 0.0001 and 1.0 mm Hg. The chamber wall 24 provides a window 25 through which X-rays may pass. A filter 28 typically formed of aluminum or other metal is positioned in the window 25 for the purposes of absorbing the low energy secondary X-rays that pass through the window. When aluminum is used for the filter material, its thickness is approximately 0.30 mm. The filter 28 also forms a vacuum tight seal for the hole 26 in the wall 24 of the vacuum chamber. A rubber O-ring 27 performs the sealing function. The filter 28 may also be of glass, approximately 1 mm thick, to accommodate the optical alignment system shown in FIG. 3 and described later.

An aperture chamber 30, whose walls are impervious to the passage of X-rays, has a window 32 that is aligned with window 25 to allow the primary X-rays that pass filter 28 to enter the chamber 30. At the opposite end of chamber 30, a second chamber window 34 in alignment with windows 25 and 32 permits the continued passage of primary X-rays out of chamber 30 and into an enclosure 36 that is similarly sealed against X-rays and, in this case, also against light. Enclosure 36 has a wall 38 in which is formed a window 39 that faces the second chamber window 34 and is aligned with windows 25, 32 and 34. A second X-ray filter 40 located between windows 34 and 39 is made of aluminum or other metal of a thickness suitable to prevent the passage of light and secondary X-rays through its thickness. Generally, the filter 40 is of aluminum and has a thickness of about 0.2 mm.

An adjustable slit assembly 42 is mounted within chamber 30 and includes an aperture partition 44, through which a slit 46 is formed; an aperture block 48; longitudinally extending spring metal strips 49 and 50, which are mechanically fastened to the outer surfaces of partition 44 and block 48; a mounting block 52 secured to the inner surface of chamber 30; an adjustable micrometer 54 having a portion passing within chamber 30 that abuts the aperture block 48 and a portion extending outside chamber 30 for adjusting the position of the aperture block. The micrometer is fixed to the wall of chamber 30 and is sealed thereto against the passage of light and X-rays. The mounting block 52 is joined to the inner surface of the walls of chamber 30 and to the aperture block with metal strip 50 interposed therebetween.

When the micrometer handle is turned, the position of the slit 46 is adjusted transversely, thereby defining a cone 22 having its apex at the impact spot 26, which cone bounds the X-ray stream that is permitted to pass through windows 34 and 39. The cross-sectional shape of slit 46, as shown in FIG. 1, is preferably that of a truncated cone symmetrical about the lateral axis. Slit 46 could instead have side walls that are parallel and axially directed throughout the entire thickness of the partition 44, but a smaller angle of view would result than when the shape is conical. Alternatively, slit 46 could be conically shaped, the apex of the cone being located toward aperture block 48 and the walls extending away from the apex through the thickness of the partition 44 in the direction of the impact spot.

It is important to note that the material from which partition 44 is formed and its thickness must be such that all X-rays that have passed through filter 28 must be absorbed by the partition. In this way, only the primary X-rays that are aligned with the axis of slit 46 are permitted to pass through the chamber 30 and into the enclosure 36. Any possibility of X-rays from the welding machine getting into the environment and creating an X-ray hazard is thereby also prevented.

The enclosure 36 has an opening 55 at its lower surface for the passage of the driveshaft 56 of a constant speed induction motor 58, the driveshaft being joined by way of a set screw 59 to a rotating drum 60 made from a nonmagnetic material. Opening 55 is provided with a labyrinth seal 62 that furnishes a light and dirt seal for the driveshaft and drum attachment.

The rotating drum 60 has a base 64 and cylindrical walls 66. A plurality of axially directed slots 68 are formed through the thickness of wall 66 at 45 degree intervals around the circumference of the drum 60. Slots 68 are approximately 1 mm wide and extend to a depth such that the bottom of the slots 68 align with the lower edge of the windows 34, 39, aperture 48 and slit 46. The axially outermost end of each slot 68 is closed off by a magnetic vane 70 having a thickness equal to the width of the slot and extending into the slot such that its lower surface aligns with the corresponding surface of the windows 34, 39, aperture 48 and slit 46.

Magnetic pickups 72 and 74 are fastened to a mounting plate 73 that is secured to the enclosure 36 by mounting screws 75. The magnetic pickups are positioned immediately above the path that the magnetic vanes 70 follow as the drum 60 rotates. The precise distance between the magnetic pickups is determined by the position they occupy on the mounting plate, and this position is readily set by precision machine procedures whereby the holes into which the mounting pickups 72 and 74 are inserted is established within a close tolerance.

A photomultiplier tube 78 is mounted on the upper surface of enclosure 36 by way of a light-tight mount and seal 80. The photomultiplier tube produces an electric pulse when light enters from a photo coupler 84.

A scintillator crystal 82 is located within enclosure 36 in alignment with slots 68 and faces outwardly toward the direction of the impact spot 26 along the longitudinal axis of chamber 30. The scintillator crystal may be thalium activated sodium iodide NaI(Tl). The light coupler 84 joins the scintillator crystal to the photomultiplier tube 78 and is made of a clear plastic painted on its outer surface with a white colored material to collect all the light rays onto the photomultiplier tube. The coupler functions by transmitting the fluorescent light produced by the scintillator to the photomultiplier tube. Light produced by any other source would defeat the purpose of this scintillator crystal which is adapted to produce a light pulse when the slots 68 of the rotating drum 60 move through the X-ray beam that passes through window 39; therefore, the box 36 is light tight, as mentioned previously.

Alternatively, each slot 68 of the rotating drum 60 may be fitted with a thin scintillator crystal having a thickness equal to the width of the slots, the axially outermost ends of the slots being occupied by magnetic vanes 70. The light coupler 84 would extend radially outwardly from the axis of photodiode 78 into close proximity with the inner surface of the cylindrical walls 66 of rotating drum 60. Each scintillator crystal will produce a light pulse when the vane in which it is fitted aligns with window 39 and the primary X-rays pass through 39 into the scintillator crystal. The photo-coupler 84 would function identically as previously described in transmitting the light pulse from the individual scintillator crystals to the photomultipler 78.

FIG. 3 illustrates the use of a light source in conjunction with the electron beam impact spot positioning control hereinabove described for indicating the position of the target impact spot 26 on the workpiece 12. A glass mirror 86 is mounted within chamber 30 and is arranged to reflect light from the light source outwardly along the longitudinal axis of chamber 30 through windows 25 and 32, but after metal filter 28 is replaced by a glass window and vacuum seal 87. Glass window 87 and glass mirror 86 are thick enough to let the X-rays pass with little attenuation. The light must pass through aperture block 48 and slit 46 and suitable seals must be arranged to prevent passage of light into the vacuum chamber from any source other than that which passes through slit 46. Before the electron beam 14 is directed at the workpiece 12, light passing through slit 46 is projected onto the workpiece 12 thereby providing a clear visible indication of the plane of the target impact spot. By adjusting the micrometer setting, the position of the impact spot target can be adjusted and the operator is given an immediate indication of the electron beam impact spot before welding begins. This light indicator does not interfere with the operation of the automatic beam position control, as described. For proper mutual alignment adjustment devices (not shown) are used to position the light source and the mirror 86.

In operation, primary X-rays emanating from the actual impact spot 26 pass into the position control through windows 25, 32, 34 and 39, slit 46 and aperture 48 until they strike rotating drum 60. When slot 68 formed in the drum passes the X-ray field, the X-rays enter the drum and strike the scintillator crystal material. The scintillator 82 then produces fluorescent light which is transmitted by the light coupler 84 to the photomultiplier 78, which then produces an electric pulse. After the slot 68 rotates past the X-ray beam, the ferrous vane 70 that is located in that slot passes under the magnetic pickup 72, which then produces a second electrical pulse. A later, third electrical pulse is generated as the ferrous vane 70 passes under magnetic pickup 74.

These three pulses are used by the position control to determine the angle at which the X-rays enter slit 46 and slot 68. As the angle changes, the time difference between the photodiode pulse and the first pulse produced by magnetic pickup 72 changes also. This phenomenon is best illustrated with reference to FIG. 4. A weld 16 is being made on workpiece 12 upon which the actual impact spot 88 is coincident with the target impact spot 26; the X-ray field passing through slit 46 and drum slot 68 produces the first electrical pulse when slot 68 is aligned with slit 46 and spot 26. However, if the actual impact spot 88 is displaced from the target spot 26, the X-ray field which passes through slit 46 continues in a straight line and enters drum slot 68 when the slot has advanced further in its rotary cycle. In this case, the first electrical pulse is produced at a later point in time than when the target spot 26 and the actual spot 88 are coincident. Regardless of whether the target spot 26 and the actual spot 88 are coincident, the second electrical pulse is produced when the slot 68 and the ferrous vane 70 pass under the magnetic pickup 72. A third, later electrical pulse is produced when slot 68 passes under magnetic pickup 74. Because the drum 60 is rotating at a constant speed, the duration of the time interval between the photomultiplier pulse and the pulse produced at magnetic pickup 72 is a measure of the angular displacement of the X-ray field entering drum slit 68. The distance between magnetic pickup 72 and 74 is a fixed value; consequently, the time interval between the occurrence of the second and third pulses is a constant. The constant time interval is subtracted from the first, variable time interval to provide a difference that represents the angular deviation of the rotating drum when the X-ray beam enters the drum as compared to its angular position when the actual impact spot 88 is coincident with the reference impact spot 26. The difference in duration of the time intervals represents an error signal indicative of the displacement of the actual impact spot from its reference position.

Figure 5:
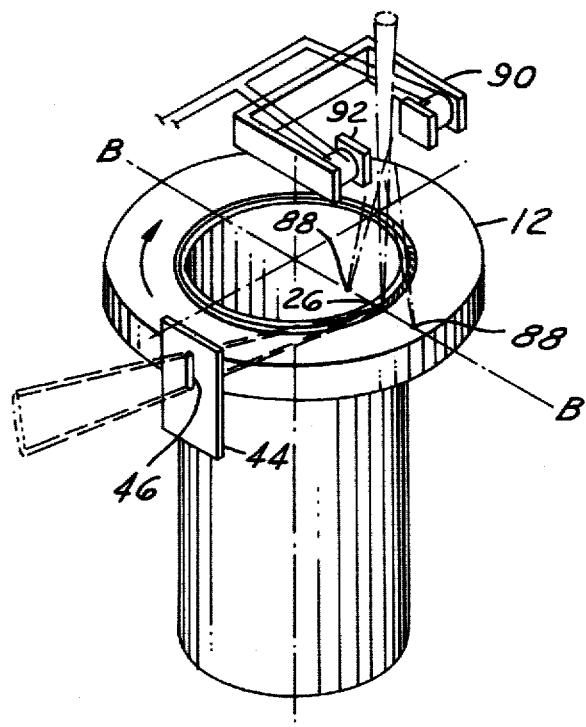
FIG. 5 is a schematic view of a focused electron beam directed toward a workpiece, but passing between magnetic deflection coils that are positioned between the electron beam source and the workpiece.

An output amplifier amplifies the error signal and produces the current output which drives the electron beam deflection coils 90, 92 that are best seen in FIG. 5. The deflection coils are positioned between the electron beam source and the workpiece 12. They are arranged generally perpendicular to the axis of the electron beam and in alignment with the longitudinal path taken by that portion of the primary X-rays that emanate from the impact spot and pass through chamber 30 and into the rotating drum 60. Depending on the direction of the deviation of the impact spot 88 from its reference position 26, the current through coils 90 and 92 is positively or negatively directed so as to produce a magnetic field whose lines of flux extend between the magnetic deflection coils. The polarity of the fields will depend on the direction of the current resulting from the error signal. The electron beam passing through the magnetic field is instantaneously deflected and redirected, without inertial losses, in the direction and of the amount determined by the current in the deflection coils. In this way, impact spot 88 can be made to coincide with its reference position 26. Movement of the electron beam in response to energizing the deflection coils is along the axis B—B, which is perpendicular to the longitudinal axis in which the primary X-rays pass to reach the photomultiplier 78.

A beam position control according to this invention can be adapted for making nonlinear electron beam welds on a workpiece. Preferably, electron beam welding is performed within a vaccum chamber, although welding of this kind can be performed under ambient conditions as well. Nonlinear welding within the vacuum chamber can be accommodated with the electron beam position control illustrated in FIGS. 6 and 7.

A workpiece follower 100 extending transversely from a longitudinally extending follower arm 102 contacts an outer contour 104 of the workpiece 12, which contour is located a fixed distance from the weld 16 and the non-linear seam 17 to be welded. The workpiece 12 is moved along a straight line toward or away from the control unit and is positioned such that the focal point of the beam 14 falls upon the reference impact spot 26 which is a point on the seam 17. The inner end of the follower arm is secured to an anchor plate 106. A thin metal sheet 108 placed between the anchor plate 106 and the doubler 112 functions as a hinge allowing the follower arm 102 to move vertically by causing bending through the thickness of the spring sheet material 108. The outer end of sheet 108 is joined by a mechanical attachment 110 to anchor plate 106 and doubler 112. A vertically extending bracket 114 furnishes, at its lower end, a surface to which the spring sheet 108 is mechanically attached and, at its upper end, a surface to which the inner end of an upper arm 116 is secured. Bracket 114 provides a surface to which one leg 118 of a piano hinge assembly 119 is mechanically attached to the outstanding leg of a vertically positioned angle bracket 122, the other leg of which is fixedly secured to the vacuum chamber wall 124. The axis of the piano hinge is in the vertical plane, thereby permitting the workpiece follower arm 102 to move in a transverse direction and to follow the contour of the workpiece 12.

Upper arm 116 extends longitudinally outwardly from its attachment to the bracket 114 in parallel relationship to the follower arm 102. A sliding block 124 has an axial bore 125 through which the upper arm 116 passes to permit the block to slide longitudinally on the arm 116. Extending vertically upwardly from the sliding block 124 is a cylindrical stud 126. Block 124 is adjustable on arm 116 and once its position is established, a mechanical attachment 127 secures its position on the arm 116.

Located immediately above the upper arm 116 is a parallelogram assembly 128 to which an aperture plate 130 is attached. Plate 130 has formed through its thickness a slit 47 similar to that which was previously described. The parallelogram assembly 128 includes a channel bracket 134 having a vertically directed web which is turned outwardly at its outermost end to define a flange 135 to which the aperture plate 130 is mechanically joined. Transversely opposite and extending parallel to bracket 134 is a second channel bracket 132. The structural continuity between the brackets is provided by upper and lower straps 136 and 137 that are attached to the flanges of brackets 132 and 134 by mechanical attachment 138 and 139. Alternatively, straps 136, 137 may be an integral part of the guide arm 160.

The webs of channels 132 and 134 are resiliently mounted on the walls of the vacuum chamber 24 in a similar fashion to what was described for the follower arm. In the case of brackets 132, 134, however, spring sheets 140 and 142 are interposed between doublers 144 and the web of channels 132 and 134, but the thickness of the sheet material 140, 142 permits resilient bending of the parallelogram assembly 128 in a direction transverse to the axis of the follower arm 102. Doublers 144 and the web of brackets 132 and 134 and the sheet material 140, 142 is joined by a staggered row of attachments 146. The inner end of the spring sheet material 140, 142 is placed between the outstanding leg of angle brackets 148 and doublers 150. A staggered row of attachments 152 secures the spring sheet to the angle brackets 148, and the second leg of angle brackets 148 is mechanically secured to the vacuum chamber wall by a double row of attachments 154.

The window 32 through the vacuum chamber wall 24 has a metal filter 28 positioned on its outside surface and is mounted with a seal 29 to maintain the vacuum within the chamber and to prevent the passage of secondary X-rays outwardly from the vacuum chamber. The remaining components of the position sensor control are positioned outside window 32 is a similar arrangement as to what has been previously described, except that the axis of the motor 58 and the rotating drum 60 is skewed with respect to the plane of the chamber wall 24.

Figure 6:
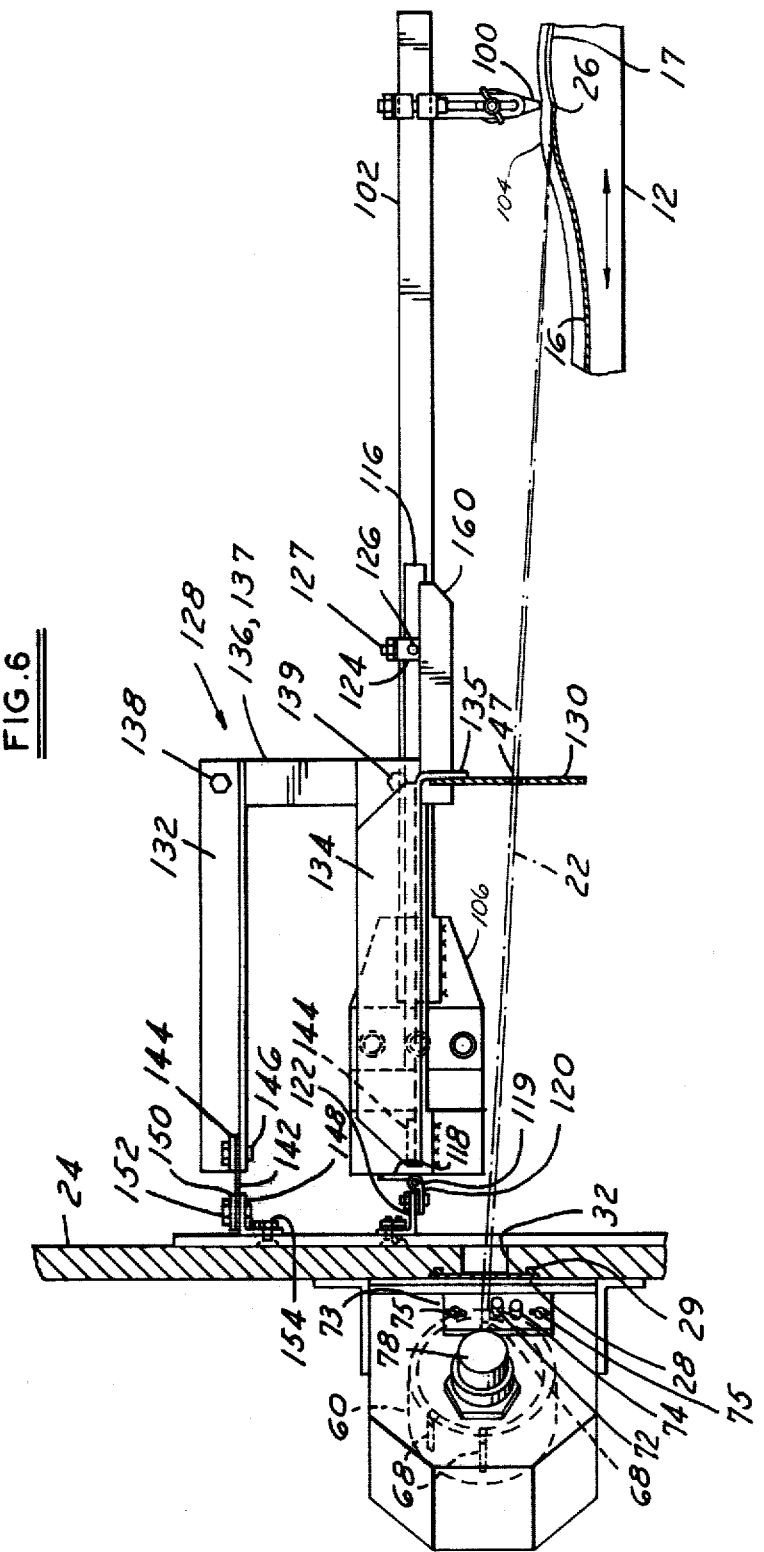
FIG. 6 is a plan view of an impact position control having a workpiece follower and the slit positioned within the vacuum chamber for controlling the position of the actual impact spot on a workpiece upon which a nonlinear weld is being made.
Figure 7:
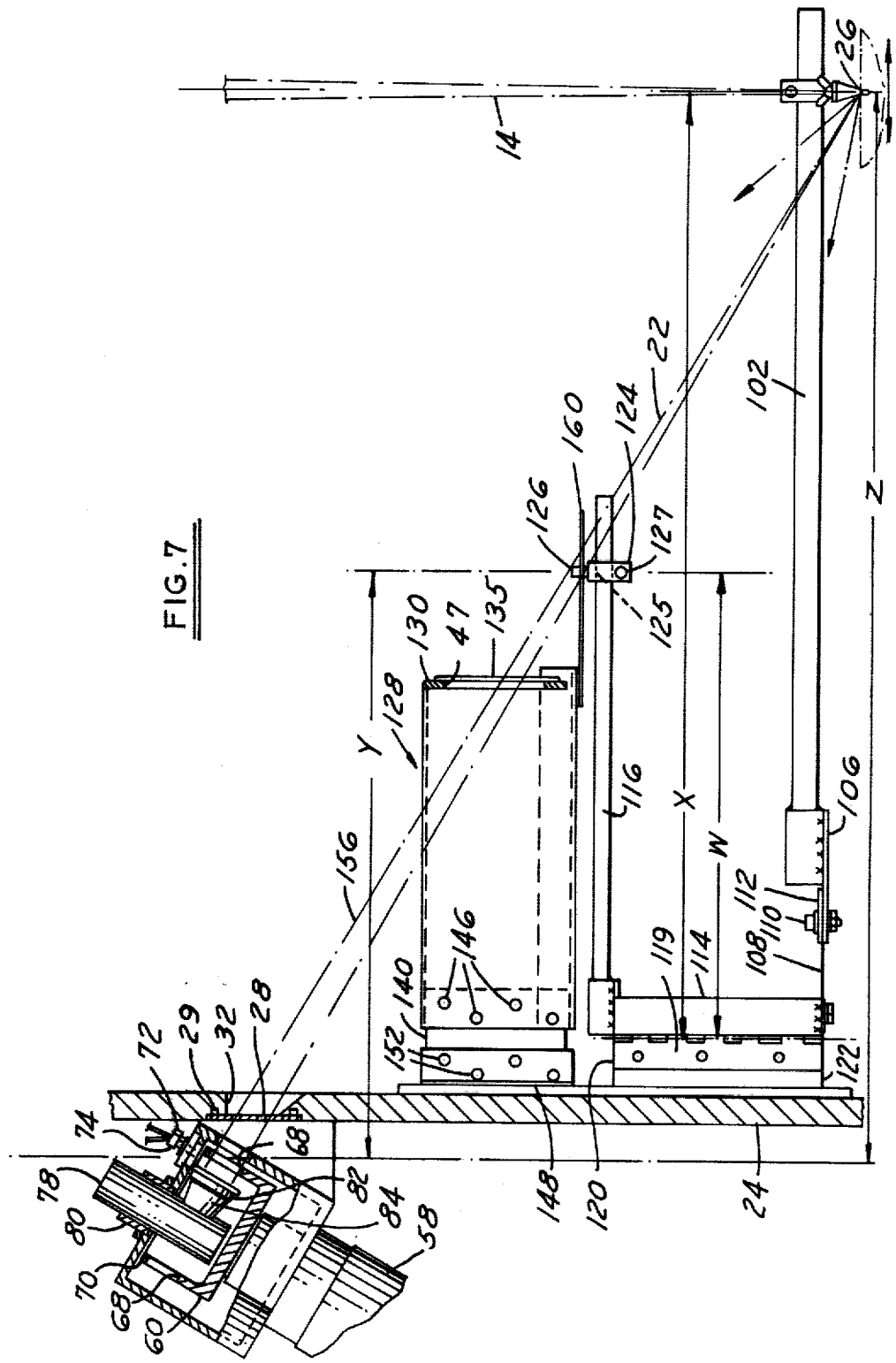
FIG. 7 is a side elevation view of the impact spot position control shown in FIG. 6.

The cone of X-rays 22 utilized in connection with the beam position control illustrated in FIGS. 6 and 7 is seen emanating from the impact spot 26 and passing through slit 47, window 32 and slot 68 formed in the rotating drum 60. The X-rays strike the scintillator crystal 82 which produces a light pulse that passes through the light coupler 84 into the photomultiplier 78 thereby producing the first electrical pulse. As the ferrous vanes positioned in slots 68 pass under magnetic pickups 72 and 74, second and third electrical pulses are produced.

The cylindrical stud 126 that extends from the sliding block 124 contacts the edge of a guide arm 160 which is fixedly secured to the parallelogram assembly. In this way the position of the slit 47 is moved by an appropriate amount in the same direction as the weld seam 17. In operation, the workpiece 12 passes under the focal point of the electron beam and the workpiece follower 100 is maintained in contact with the contours of the workpiece 12. Accordingly, the follower arm 102 follows the nonlinear path of the weld seam 17, and the contact between stud 126 and the slit holding arm 160 regulates and laterally repositions the parallelogram assembly in response to variations in the weld seam path.

In this way, the position of slit 47 undergoes continual variations in the lateral direction as the workpiece contour and weld seam vary in that direction. As a result of this transverse motion of slit 47, the utilized cone of X-rays 22 passing through slit 47 will enter the rotating drum 60 through slots 68 with a changing angular relationship with respect to previous positions of slit 47. For example, with reference to FIG. 8, assume initially the reference impact spot 26 and the actual impact spot 88 are coincident when the workpiece follower 100 is positioned as indicated. The workpiece is moved under the electron beam linearly in the direction indicated by the arrow C. At an increment of time later, the reference impact spot 26 is displaced from its original position to 26', the follower arm is displaced to 100' and slit 47 undergoes a corresponding lateral displacement to 47', but the actual impact spot 88 is assumed to remain at its initial position. The cone of X-rays 22 emanating from the actual impact spot 88 passes through the later position of slit 47', and into the rotating drum 60 through drum slit 68'. Primary X-rays, therefore, enter drum 60 with an angular change compared to the path taken initially. The direction of drum rotation is indicated by arrow D. In this case, the duration of the first interval between the occurrence of the electrical pulse produced in the photodiode following the production of the light pulse in the scintillator 82 and the occurrence of the second electric pulse produced when ferrous vane 70 passes under magnetic pickup 72 is increased over the duration of this interval at the first instant of time. The increase in duration of this interval is a measure of the displacement of the actual impact spot 88 from the reference impact spot position 26' at the second instant of time. An error signal, as previously described, is produced as a measure of this interval change, amplified and a current signal produced. The current signal is applied to the deflection coils 90 and 92, as illustrated in FIG. 5, to produce a magnetic field between the coils. This field acts to redirect the electron beam cone 22 thereby causing the actual impact spot 88 to be moved laterally along axis B—B to the reference impact spot 26'.

Correct use is made of the beam positioning sensor illustrated in FIGS. 6 and 7 only when certain pertinent dimensions are maintained among the various components thereof. The position sensor pivots along the axis of the piano hinge assembly 119. The location of this axis is longitudinally removed from the outer surface of the rotating drum 60, but the position of slit 47 varies as the parallelogram pivots about the axis of the piano hinge 119. In order to assure that the repositioning of slit 47 corresponds to and will produce a correct readjustment of the reference impact spot 26, it is essential that the distance from the axis of the piano hinge 119 to the centerline of stud 126, W, bears the same relationship to the distance from the piano hinge axis to the contact point between the workpiece follower 100 and the workpiece 12, X, as the distance from the surface of the rotating drum 60 to the centerline of stud 126, Y, bears to the distance from the surface of rotating drum 60 to the contact point between the workpiece follower 100 and the workpiece 12, Z.

The electronic controls that receive as input the three electrical pulses produced by the photomultiplier 78 and the magnetic pickups 72, 74 to produce the electron beam deflection control current is set out in the block diagram of FIG. 9. The photomultiplier pulse PX, the first magnetic pickup pulse P1, and the second magnetic pickup pulse P2, are first converted into logic level pulses in the input conditioning circuitry 251, 252 and 253. Pulses PX, P1, P2 and the clock pulse PC from a 60 KHz internal clock 200 are received by a counter control circuit 202, which produces internal control signals, namely LOAD signal 204, UP signal 206 and ENAB signal 208, all of which control a counter 210. A fourth, the GATE signal 212, is delivered to a storage register 214.

The determination of movement of the actual impact spot 88 from the reference spot position 26 is performed by the logic circuitry, which comprises a counter control circuit 202, the counter 210, the storage register 214, and a digital-to-analog converter 216. The logic circuitry determines the duration of the interval between the occurrence of pulse PX and pulse P1 as well as the duration of the interval between the occurrence of pulse P1 and pulse P2, which interval is a constant when the speed of electric motor 58 is a constant value. The length of the second interval is subtracted from the length of the first interval to provide a difference. The position of the magnetic pickup 72 and 74 is related to the position of the slots 68 on the rotating drum 60 so that when the actual impact spot 88 is at its reference position 26, both intervals are equal in duration resulting in a difference of zero. As the impact spot changes position, the position of the slots 68 at which pulse PX occurs also changes. This results in a shorter or longer time interval between the occurrence of pulse PX and pulse P1 depending upon the direction in which the impact spot has moved. Therefore, either a negative or a positive difference value results. This difference is converted to a voltage level and becomes the error signal.

Counter 210 counts pulses from clock 200; it counts up during the first interval after receiving signals 204, 206 and 208, then counts down during the second interval. The resulting count value, either positive or negative, represents the difference in length of the two intervals. The count difference from the counter is stored in the storage register 214. The storage register contents are converted by the digital-to-analog converter 216 to a voltage level which represents the error signal, ERR. This ERR signal is then used by a limit control 218, a meter amplifier 220 and an output amplifier 222. The limit control 218 produces a relay contact closure whenever the ERR signal exceeds a preset level. The meter amplifier 220 converts the ERR signal into a low level current signal for the ERR meter 221. The output amplifier 222 amplifies the ERR signal and provides the current output to drive the electron beam deflection coils 90, 92.

The intensity of the X-rays produced during welding can vary widely. Reasons for this are, for instance, a programmed variation in the welding current, or a varying penetration of the electron beam into the workpiece, which causes a variation in the absorption of the X-rays by the workpiece itself. Concurrently, with the intensity variations in the X-ray beam, the light intensity of the scintillation light pulse will vary. Thus, the electronic signal generated by the scintillation light pulse may vary widely. This is undesirable, since the timing of an electronic pulse is somewhat affected by its intensity and rise-time, which change the effective pulse width. Therefore, the input conditioning circuit 251, which generates the pulse PX, contains means for keeping the electronic pulse light within narrow limits, in spite of the fact that the height of the light pulse varies widely. Such means are well known in the art and may comprise either one of the following, separately or in combination: the photomultiplier tube wired to quasilogarithmic response; or the pulse from the photomultiplier tube, or from another kind of light detector, first passed through an amplifier with logarithmic response before being applied to the counter control circuit 202.

Figure 10:
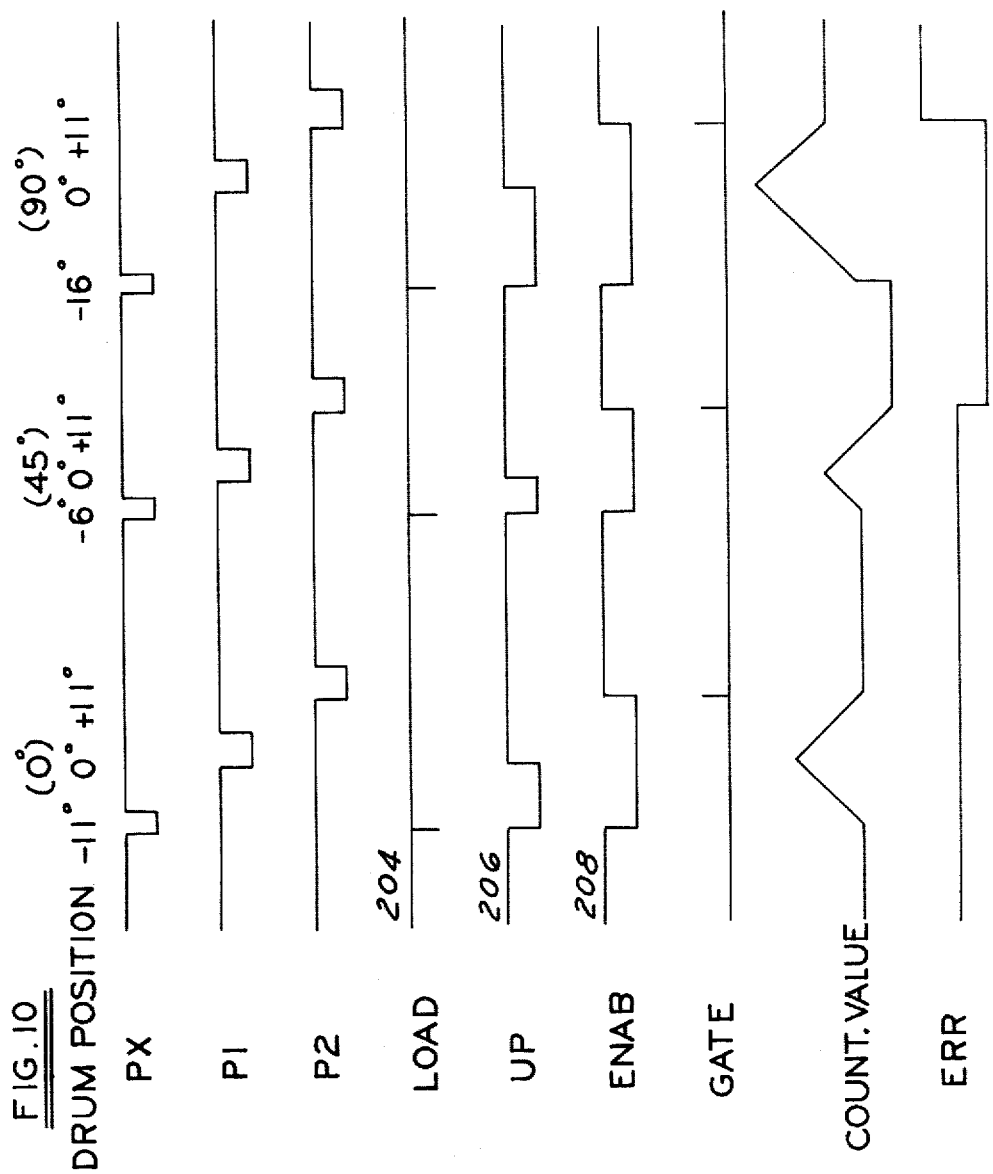
FIG. 10 is a timing diagram of the logic signals for three cycle counts representing the possible relative positions of the actual and reference impact spots.

FIG. 10 shows the timing diagram examples of the logic signals for three discrete count cycles. During the first cycle, the actual impact spot 88 is located at its reference position 26. During the second cycle, the impact spot 88 has displaced in such a way that the X-ray photomultiplier 78 produces its pulse, PX, 5 degrees of drum 60 rotation later than its occurrence during the first cycle. During the third cycle, impact spot 88 has displaced in the opposite direction from its displacement during the second cycle, so that the X-rays strike the photodiode 78 and produce pulse PX 5 degrees earlier than if the impact spot 88 were at its reference position 26.

Each cycle begins only after the light pulse is detected within photomultiplier 78 and PX occurs. When pulse PX occurs, the counter 210 is simultaneously reset to zero by the LOAD signal 204, is set to count up by UP signal 206 and is enabled for counting by ENAB signal 208. The counter 210 counts in a positive direction until the first magnetic pickup pulse P1 occurs. Then UP signal 206 reverses the direction of the counter 210, which counts in a negative direction during the interval between the occurrences of pulses P1 and P2. When P2 occurs, the counter 210 is disabled by ENAB. The count value then present in the counter is gated by the GATE signal into the storage register 214 which holds this value until the next count cycle. The contents of storage register 214 are converted in the digital-to-analog converter 216 to the signal ERR. Once ERR signal is produced, the count cycle is concluded and not begun again until the next occurrence of the PX pulse.

Before being presented to the high current amplifier 222 which produces the deflection coil output current 224, the ERR signal is amplified by an adjustable gain operational amplifier whose gain is adjustable from 1 to 5. The output of this amplifier drives the current amplifier 222.

Changes and modifications in the specifically described embodiments can be carried out without departing from the scope of the invention which is intended to be limited only by the scope of the appended claims.

Having thus described preferred embodiments of our invention, what we claim and desire to secure by U.S. Letters Patent is:

1. A device for controlling the position of an electron beam impact spot at a reference position on a workpiece comprising:
   first aperture means mounted for adjustable movement, directed toward the reference position so that X-rays emanating from the impact spot may pass through said first aperture means, which together with the reference position defines a plane;
   second aperture means moveable into and out of alignment with the defined plane, whereby X-rays that pass through said first aperture means may pass through said second aperture means when such alignment is effected;
   means responsive to the X-rays that pass through said second aperture means for producing an error signal indicative of the dislocation of the impact spot from the reference position; and
   means responsive to the error signal for moving the position of the impact spot to the reference position.

2. The device as set forth in claim 1 wherein said first aperture means comprises a partition having a narrow slit therethrough, the slit defining a cone of such X-rays having its apex at the impact spot through which slit the cone of X-rays pass, the partition being mounted for movement transverse to the axis of the cone of X-rays.

3. The device as set forth in claim 2 wherein said adjusting means comprises a fixedly mounted base portion and a stem portion adjustably engaging the base portion and abutting the partition whereby the position of the partition is adjusted by varying the position of the stem portion with respect to the base portion and the cone of X-rays is redefined as the partition location is adjusted.

4. The device as set forth in claim 2 wherein said second aperture means includes:
   a second aperture; and
   means for moving said second aperture at a constant speed across the cone of X-rays from a first position at which the X-rays do not enter said second aperture to a second position at which the X-rays enter said second aperture.

5. The device as set forth in claim 4 wherein said second aperture means includes a plate having a slot therethrough, movable from the first position to the second position where the slot is substantially aligned with the cone of X-rays that passes through said first aperture thereby permitting the X-rays to pass through said second aperture.

6. The device as set forth in claim 4 wherein said second aperture comprises:
   a circular cylinder mounted for rotation about its longitudinal axis having a plurality of uniformly spaced slots formed through the cylindrical surface around the circumference;
   and said second aperture means further includes means for rotating the cylinder at a substantially constant speed wherein each slot moves from the first position to the second position where each slot is substantially aligned with the cone of X-rays having its apex at the impact spot and passing through said first aperture thereby allowing the X-rays to pass through said second aperture.

7. The device as set forth in claim 1 wherein said adjusting means comprises:
   a follower arm maintained at a fixed distance from the impact spot as the workpiece is moved under the beam, pivotably mounted for movement as the direction of the weld seam varies;
   means responsive to movement of said follower arm for adjusting the position of said first aperture.

8. The defice as set forth in claim 1 wherein said error signal producing means comprises:
   means for producing a first electrical pulse when the X-rays pass through said second aperture means;
   means for producing a second electrical pulse when said second aperture means moves to a second position;
   means for producing a third electrical pulse when said second aperture means moves a predetermined distance from said second position to a third position;
   means responsive to the difference in duration of a first interval extending between the occurrences of the first and second electrical pulses and the duration of a second interval extending between the occurrences of the second and third electrical pulses for producing an error signal when the difference is substantially other than zero.

9. The device as set forth in claim 8 wherein said first pulse producing means comprises:
   means positioned on the opposite side of said second aperture means from the impact spot for producing a light pulse when the X-rays pass through said aperture means; and
   means responsive to the light pulse for producing a first electrical signal when the light pulse is produced.

10. The device as set forth in claim 9 wherein the means for producing the light pulse is located within the second aperture means and directs the light pulse toward the first electrical signal pulse producing means.

11. The device as set forth in claim 9 wherein the means for producing the light pulse is a scintillator crystal and the first electrical pulse producing means is a photomultiplier tube.

12. The device as set forth in claim 8 wherein the second electrical pulse producing means comprises:

a first magnetic field-inducing pickup located adjacent the fixed path of the second aperture; and
a magnetic vane aligned with the second aperture and movable therewith through the magnetic field of said pickup whereby the second electrical pulse is produced when said vane passes through said magnetic field.

13. The device as set forth in claim 12 wherein the third electrical pulse producing means comprises:
a second magnetic field-inducing pickup located adjacent the fixed path of the second aperture and at a predetermined distance from the position of the first pickup whereby the third electrical pulse is produced when said vane passes through the magnetic field induced by the second pickup.

14. The device as set forth in claim 8 wherein the error signal producing means further includes means establishing a predetermined difference in duration of the first and second intervals and means responsive to the predetermined difference and the actual difference for producing an error signal if the actual difference is less than the predetermined difference and whereby the error signal is produced if the actual difference exceeds the predetermined difference.

15. The device according to claim 8 wherein said impact spot positioning means comprises:
at least one magnetic coil and two pole pieces for producing a magnetic field whose polarity is determined by an electrical current passing therethrough, the pole pieces providing a space therebetween into which the beam of charged particles passes before striking the workpiece; and
means responsive to the error signal for producing electrical current to establish the polarity of the magnetic field into which the beam passes thereby altering the direction of the beam to reposition the impact spot on the workpiece to its reference position, the direction of the electrical current depending on whether the duration of the first interval is greater or less than the duration of the second interval between the pulses.

16. The method of controlling the position of a beam of charged particles that strikes a workpiece at an impact spot on a seam:
and moving the workpiece under the beam;
passing X-rays emanating from the impact spot first through a first aperture then through a moving aperture;
producing a first electrical pulse when X-rays emanating from the impact spot pass through the moving aperture;
producing a second electrical signal when the moving aperture moves to a second position;
producing a third electrical signal when the moving aperture moves to a third position;
establishing an electrical error signal when the difference in duration of a first interval extending between the occurrences of the first and second pulses and the duration of a second interval extending between the occurrences of the second and third pulses is greater than a predetermined difference;
passing the beam before it strikes the workpiece through a magnetic field whose polarity is determined by actuating a magnetic coil by passing an electrical current therethrough;
redirecting the beam by supplying electrical current to a magnetic coil when the error signal is produced thereby relocating the impact spot to its desired position.

17. The method according to claim 16 wherein passing the X-rays through the moving aperture includes:
placing a follower in contact with a contour of the workpiece which contour is maintained a constant distance from the seam along its length;
adjusting the position of the first aperture in response to changes in the contour as the workpiece moves under the beam; and
bringing the moving aperture into alignment with the X-rays passing through the first aperture from a position at which the first and moving apertures are not aligned, whereby the X-rays pass through the first and second apertures and the beam is held onto the seam.

18. The method according to claim 16 wherein passing the X-rays through the moving aperture includes:
positioning a surface located at a constant distance from the seam along its length which surface moves linearly as the workpiece moves linearly under the beam;
placing a follower in contact with the surface;
adjusting the position of a first aperture in response to changes in the contour of the surface as the workpiece moves under the beam; and
bringing a moving aperture into alignment with the X-rays passing through the first aperture from a position at which the first and second apertures are not aligned whereby the X-rays pass through the first and the second aperture and the beam is held onto the seam.

* * * * *